July 30, 1968
D. G. LEVINE ET AL
3,395,046
FUEL CELL AND METHOD OF OPERATION
Filed Dec. 19, 1963
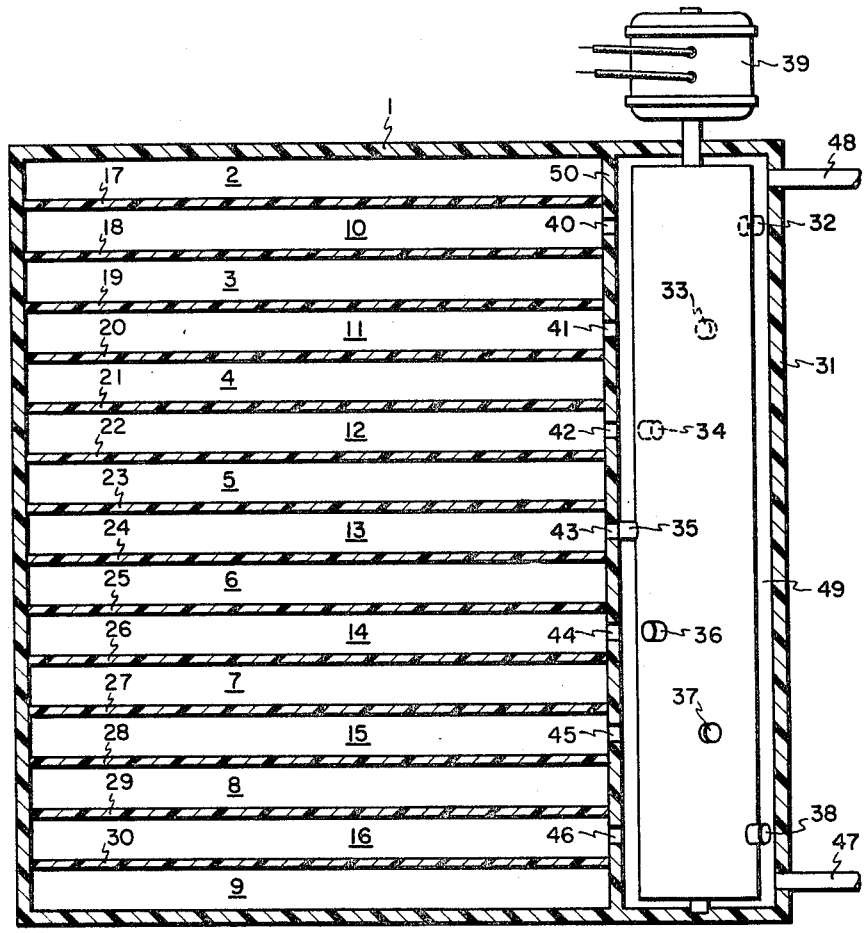
DUANE G. LEVINE
JAMES A. WILSON
INVENTORS
BY *Henry Berk*
PATENT ATTORNEY 006
United States Patent Office 3,395,046
Patented July 30, 1968

3,395,046
FUEL CELL AND METHOD OF OPERATION
Duane G. Levine, Fanwood, and James A. Wilson, Stanhope, N.J., assignors to Esso Research and Engineering Company, a corporation of Delaware
Filed Dec. 19, 1963, Ser. No. 331,824
6 Claims. (Cl. 136—86)

This invention relates to an electrochemical conversion of chemical energy to electrical energy. In particular, this invention relates to a method of operating a fuel cell and an apparatus for performing such operation. More particularly, this invention relates to a method of controlling the oxidant input to the cathode so as to provide more efficient operation and to an apparatus for performing such method.

The term "fuel cell" is used herein and in the art to denote a device, system or apparatus wherein chemical energy is electrochemically converted to electrical energy. The true fuel cell when adapted for continuous operation includes two nonsacrificial or inert electrodes, functioning as an anode and cathode, respectively, which are separated by an electrolyte which provides ionic conductance therebetween, conduction means for electrical connection between such anode and cathode external to such electrolyte, means for admitting a "fuel" into dual contact with the anode and electrolyte and means for admitting an oxidant into dual contact with the cathode and electrolyte. Where necessary or desired, the electrolyte compartment is divided into an anolyte compartment and a catholyte compartment by an ion-permeable partition. Thus, in each such cell a fuel is oxidized at the anode with a release of electrons to such anode and an oxidant is reduced at the cathode upon receiving electrons from such cathode. In a fuel cell, the particular fuel to be oxidized at the anode is independent of the particular oxidant being used at the cathode since the half cell reactions, that is, the reactions at the anode and cathode are independent each from the other.

The object of this invention is to increase the efficiency of the fuel cell reaction by controlling the reaction at the cathode. Since this technique at the cathode is independent of the particular fuel being oxidized at the anode, it is to be understood that any of the conventional anodic oxidation systems may be used in conjunction with the method of this invention. Such well-known anodic oxidation systems include the use of acid or basic electrolytes, the oxidation of hydrogen and hydrocarbon fuels such as ethane, propane, butane, ethylene, acetylene and oxygenated hydrocarbons such as methanol, ethanol, formaldehyde and ethylene glycol. Such fuels and other well-known fuels as set forth in U.S. Patent No. 2,384,463 may be used in the practice of the instant invention.

Heretofore in the art, the loss of performance with time at the cathode, or as referred to in the art, the air, or oxygen electrode has presented an obstacle to the production of a continuously operating fuel cell. The method commonly employed by the art to rectify such losses in performance has been to dismantle the fuel cell and reactivate the catalyst. Such a method involves the loss in time of operation and adds to the expense of the cell. The problem heretofore facing the art has been to perfect a method which would allow the cells of a battery of fuel cells to be reactivated without having to shut down the battery of cells or appreciably decrease the power output.

It has now been found that the lost performance at the cathode can be essentially restored by a relatively simple technique. The technique of this invention comprises the step of cutting off the oxidant supply to the cathode for a short period of time. It has been found that this cutoff time can be of the order of 0.5 to 10 seconds, but preferably of 1 to 2 seconds. This cutoff period need only be accomplished once during every 6 to 10 hours of continuous operation, but preferably once during every 8 hours of operation. The method of the instant invention affords a great advantage over the prior art methods of reactivating the cells of a fuel cell battery in that by the instantly claimed method, it is possible to reactivate one cell at a time without having to shut down the cell or decrease appreciably the output of the cell. Each cell is reactivated by cutting off the oxidant supply to the cell for a few seconds every 6 to 10 hours. Therefore, each cell is not producing electrical power for an insignificant time during the hours of operation. The amount of power lost during the approximate 2 second shutdown of the cell causes no appreciable change in the power output of the cell.

The procedure of cutting off the oxidant supply to a cathode about 2 seconds every 8 hours can be accomplished either by using a slowly rotating drum having extensions thereon which close off the oxidant inlet to the cathode of a fuel cell once every 8 hours, or by using a device which operates intermittently. Such a device is set forth in the attached drawing.

Referring now to the accompanying drawing. There is shown a horizontal schematic view of a fuel cell battery equipped to discontinue the flow of oxidant to the cells of the battery. There is shown a nonconductive container 1 divided into two compartments, a major compartment and a minor compartment 49. The major compartment comprises a series of cells consisting of fuel compartments 2 to 9 and a series of oxidant compartments 10 to 16, said fuel and oxidant compartments being departed by bipolar electrodes 17 to 30. Minor compartment 49 is a chamber for distributing the oxidant to each of the oxidant chambers. The oxidant enters compartment 49 through conduits 47 and 48 and exits from compartment 49 into the cells through oxidant ports 40 to 46. The spent oxidant is exhausted from the cells through conduits not shown. Such exhaust conduits may be located in any convenient part of the battery. Compartment 49 contains a device 31 having a plurality of posts 32 to 38 thereon. Said posts are of the same size as ports 40 to 46 and are spirally mounted in device 31 so that as 31 is rotated, the posts will sequentially close the oxidant ports thereby stopping the flow of oxidant to each cell. It is preferred to rotate 31 so that oxidant is shut off from each cell for about 2 seconds during each 8 hour period of sustained operation. The rotation of 31 is accomplished by means of electric motor 39. Motor 39 is preferably equipped with a timing device so that 31 is rotated intermittently rather than continuously. Fuel is introduced into fuel compartments 2 to 9 through suitable convenient conduits not shown.

The bipolar electrodes as set forth in the drawing can comprise any of the known electrodes such as (1) a porous membrane metal coated on each of its surfaces and saturated with an electrolyte, (2) an ion-exchange membrane having a metal coating on each of its surfaces or an electrode system such as two electrodes separated by an ion-exchange membrane or a porous membrane saturated with an electrolyte or a space filled with a liquid or solid electrolyte may be substituted for the bipolar electrode.

Electrolytes which may be used in conjunction with this invention include the known electrolytes such as ion-exchange membranes, liquid acids, liquid bases and solid electrolytes such as carbonates and mixtures of carbonates.

The following example is for the purpose of illustration only and is not to be construed as a limitation upon the invention as set forth in the appended claims.

EXAMPLE 1

A fuel cell substantially as set forth in the drawing was operated using 30 wt. percent aqueous sulfuric acid as the electrolyte, methanol as the fuel and air as the oxidant. The cylinder was rotated so that each of the oxygen inlets was closed by one of the posts for about 2 seconds during each 8 hour period. The cylinder was rotated by a small motor which was actuated by a time mechanism. The time mechanism would come on, cause the motor to turn the cylinder to close the oxygen inlet for about 2 seconds, then turn so as to open the inlet. The timing device would then shut off the motor until it was time to cut off the next cathode compartment. The cell was first run without the reactivation of the cells by cutting off the oxygen supply. After a few hours the electrodes had polarized an additional 0.1 volt. By utilizing the method of this invention, that is, the cutting off of the oxygen supply to the cell for about 2 seconds, the cells were restored to their original polarization.

What is claimed is:

1. A fuel cell battery designed for sustaining efficient operation which comprises a container having a plurality of fuel cells therein and a means for intermittently interrupting the flow of oxidant to each cell sequentially, said container divided into a fuel cell compartment and a compartment housing the said interrupting means, each of the cells in the fuel cell compartment fitted with apertures so that the cathode compartment of each cell communicates with the interrupting means compartment, said container fitted with inlet and outlet means for the introduction and emission of oxidant to the interrupting means compartment thereby allowing the oxidant to enter each cell through said aperture, said interrupting means comprising a rotatable elongated cylinder having posts spirally arranged thereon so that as the cylinder turns the apertures to each cell are sequentially closed by said posts.

2. In an operation of a fuel cell with an anode and a cathode, comprising the steps of feeding an oxidant consisting essentially of pure oxygen and air to the cathode and a liquid fuel to the anode in an acid electrolyte, the improvement which comprises cutting off the oxidant supply to the cathode for a period of from 0.5 to 10 seconds only once during every 6 to 10 hours of cell operation.

3. A method as defined by claim 2 wherein the oxidant supply is cut off for a period of about 2 seconds only once every 8 hours of cell operation.

4. A method as defined by claim 2 wherein said oxidant is air.

5. A method as defined by claim 2 wherein said oxidant is oxygen.

6. A method as defined by claim 1 wherein said oxidant is air and wherein said fuel cell employs aqueous sulfuric acid as the electrolyte and methanol as the fuel.

References Cited

UNITED STATES PATENTS

| | | | |
|---|---|---|---|
| 1,739,787 | 12/1929 | Daughty et al. | 137—119 |
| 2,901,524 | 8/1959 | Gorin et al. | 136—86 |
| 2,946,836 | 7/1960 | Justi et al. | 136—86 |
| 2,947,797 | 8/1960 | Justi et al. | 136—86 |
| 2,988,107 | 6/1961 | Rudlick | 137—625.46 |
| 3,216,861 | 11/1965 | Cohn et al. | 136—86 |

ALLEN B. CURTIS, *Primary Examiner.*